United States Patent
Luo et al.

(10) Patent No.: US 7,136,079 B2
(45) Date of Patent: Nov. 14, 2006

(54) EDGE PRESERVING SMOOTHING METHOD

(75) Inventors: Yi Luo, Dhahran (SA); Maher I. Al-Marhoon, Qatif (SA); Saleh A. Aldossarry, Houston, TX (US); Mohammed N. Alfaraj, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 10/406,942

(22) Filed: Apr. 3, 2003

(65) Prior Publication Data

US 2004/0145591 A1 Jul. 29, 2004

Related U.S. Application Data

(60) Provisional application No. 60/439,020, filed on Jan. 9, 2003, provisional application No. 60/370,056, filed on Apr. 4, 2002.

(51) Int. Cl.
*G06K 9/40* (2006.01)
*G09G 5/00* (2006.01)
*G06T 15/40* (2006.01)

(52) U.S. Cl. .................. 345/611; 345/428; 345/606; 382/254; 382/266

(58) Field of Classification Search ............... 345/421, 345/428, 581, 586, 611, 606, 612–618; 382/199, 382/254, 255, 260, 263–269, 274–275
See application file for complete search history.

(56) References Cited

U.S. PATENT DOCUMENTS

| 6,408,028 B1 * | 6/2002 | Manjunath et al. .... 375/240.08 |
| 6,681,054 B1 * | 1/2004 | Gindele ...................... 382/272 |
| 2003/0095715 A1 * | 5/2003 | Avinash ...................... 382/260 |

* cited by examiner

Primary Examiner—Richard Hjerpe
Assistant Examiner—Wesner Sajous
(74) Attorney, Agent, or Firm—Abelman, Frayne & Schwab

(57) ABSTRACT

A method of smoothing data to reduce or remove noise while preserving edge information in the data selects an output point in the data, identifies the most homogeneous neighborhood around the selected output point and outputs a corrected value for the selected output point based upon data points in the identified neighborhood.

5 Claims, 4 Drawing Sheets

EDGE PRESERVING SMOOTHING METHOD

This application claim the benefit of provisional Application Nos. 60/370,056, filed Apr. 4, 2002 and 60/439,020, filed Jan. 9, 2003.

FIELD OF THE INVENTION

This invention relates to a method for processing noisy signals prior to edge detection analysis.

BACKGROUND OF THE INVENTION

Suppressing random noise is an important pre-processing step in the analysis of many signals. One area in which this pre-processing is important is in the analysis of seismic signals, where the suppression of random noise is advantageously implemented prior to applying an information-extraction algorithm such as a seismic edge detection or coherence cube algorithm. This pre-processing is valuable because the seismic data generally includes reflection data from around faults-and fractures in the ground, and this reflection data is usually more complicated and weaker than the data from other areas due to dispersion, diffraction and other forms of scattering.

Typically, prediction error filtering (PEF or f-x deconvolution) is used to precondition the data before edge detection. Prediction error filtering has been very successful in many areas. However, if the signal being pre-processed is not highly predictable, such as in areas of fault or fracture, this method is inadequate to remove the noise.

A simple alternative method is to smooth the data within moving windows. Unlike the PEF method, this smoothing method does not strongly depend on the predictability of the signals. The drawback here is that this method tends to blur the sharp edges that are associated with the faults and channels that are intended to be enhanced in seismic edge detection.

SUMMARY OF THE INVENTION

It is therefore an object of the present invention to provide an edge preserving smoothing method that avoids the above-described difficulties of the prior art.

It is a further object of the present invention to provide an edge preserving smoothing method that resolves the conflict between noise reduction and edge degradation, so that noise is suppressed while sharp edges are kept intact.

The above and other objects are achieved by the present invention which, in one embodiment, is directed to a method for smoothing data comprising the steps of.

In accordance with an advantageous aspect of the present invention, the method can be one-, two- or three-dimensional.

These and other objects, features and advantages of the present invention will be apparent from the following detailed description of the preferred embodiments taken in conjunction with the following drawings, wherein like reference numerals denote like elements.

DETAILED DESCRIPTION OF THE PREFERRED EMBODIMENTS

In concept, the method of the present invention looks for the most homogeneous neighborhood around each output point in a 3D seismic cube, and then give each point the average value of the selected neighborhood.

Figure 1A:
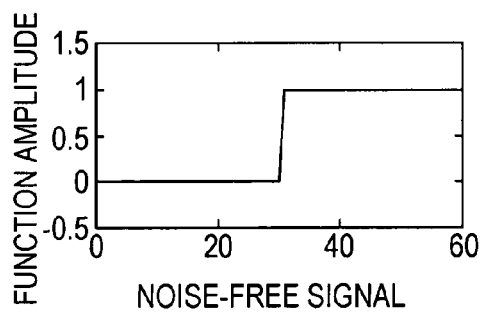
FIG. 1A shows a one-dimensional step function.
Figure 1B:
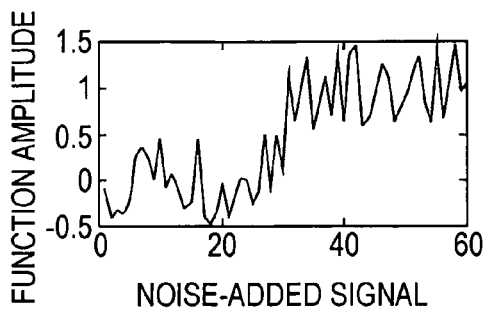
FIG. 1B shows the step function of FIG. 1A with added noise.
Figure 1C:
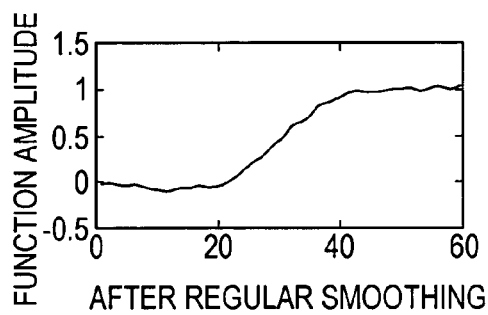
FIG. 1C shows the noisy step function of FIG. 1B after being processed with a conventional smoothing method.

FIGS. 1A–1D illustrate this concept using a simple one-dimensional (1-D) step function. FIG. 1A displays a noise-free step function. FIG. 1B shows the same step function after random noise is added. Applying a conventional 21-point smoothing filter to FIG. 1B yields the result shown in FIG. 1C. It will be seen that the random noise has been reduced, but at the same time the sharp step has been severely altered.

Figure 1D:
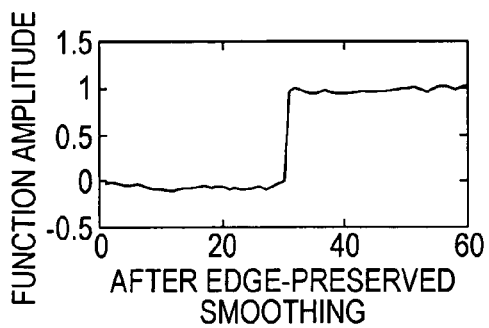
FIG. 1D shows the noisy step function of FIG. 1B after being processed with the an embodiment of the edge-preserving smoothing method in accordance with the present invention.

FIG. 1D illustrates the result of applying a 21-point smoothing operator in accordance with the present invention to FIG. 1B. In FIG. 1D, it is clear that the sharp edge has been preserved while the noise has been reduced.

While the smoothing operator in accordance with the present invention can be implemented for any desired number of points, for the purpose of simplicity and clarity in the following discussion, a five point smoothing operator will be described.

In this case, for any given output location, i.e. a sample point $A_i$ at the ith location, the smoothing operator calculates the standard deviations for the following five shifted windows:

$(A_{i-4}\ A_{i-3}\ A_{i-3}\ A_{i-1}\ A_{i+0})$
$(A_{i-3}\ A_{i-2}\ A_{i-1}\ A_{i+0}\ A_{i+1})$
$(A_{i-2}\ A_{i-1}\ A_{i+0}\ A_{i+1}\ A_{i+2})$
$(A_{i-1}\ A_{i+0}\ A_{i+1}\ A_{i+2}\ A_{i+3})$
$(A_{i+0}\ A_{i+1}\ A_{i+2}\ A_{i+3}\ A_{i+4})$

Here $A_i$ represents the amplitude of the ith sample of the noise-added step function (FIG. 1B).

Next, the method selects the window having the minimum standard deviation and outputs the average over this selected window as a corrected value for the ith sample of output. Repeating this process for all the output locations yields the result shown in FIG. 1D. It will be seen that the results of FIG. 1D are superior to those of FIG. 1C in preserving the shape of the step function while removing the noise.

More generally, for an n-point window, the n windows are defined as:

$$(A_{i-n+1} \quad A_{i-n+2} \quad \cdots \quad A_{i-1} \quad A_{i+0})$$

$$(A_{i-n+2} \quad A_{i-n+3} \quad \cdots \quad A_{i+0} \quad A_{i+1})$$

$$\vdots \quad \vdots \quad \vdots \quad \vdots$$

$$(A_{i+0} \quad A_{i+1} \quad \cdots \quad A_{i+n-1} \quad A_{i+n})$$

While the above embodiment uses a 1-D window, the method can be generalized to two-dimensional (2-D) and three-dimensional (3-D) cases. Thus, for an output location $(x_0, y_0)$, its vicinity space is divided into small fragments and the standard deviation for each fragment is calculated separately. The fragment corresponding to the smallest standard deviation is selected and its average value is used as the output for the location $(x_0, y_0)$.

The edge-preserving smoothing method in accordance with the present invention can be tested by applying an edge-detection algorithm to seismic data with and without the smoothing method applied. For this test, all the parameters for edge detection were kept the same for both runs, so that any differences are solely attributable to the smoothing algorithm.

Figure 2A:
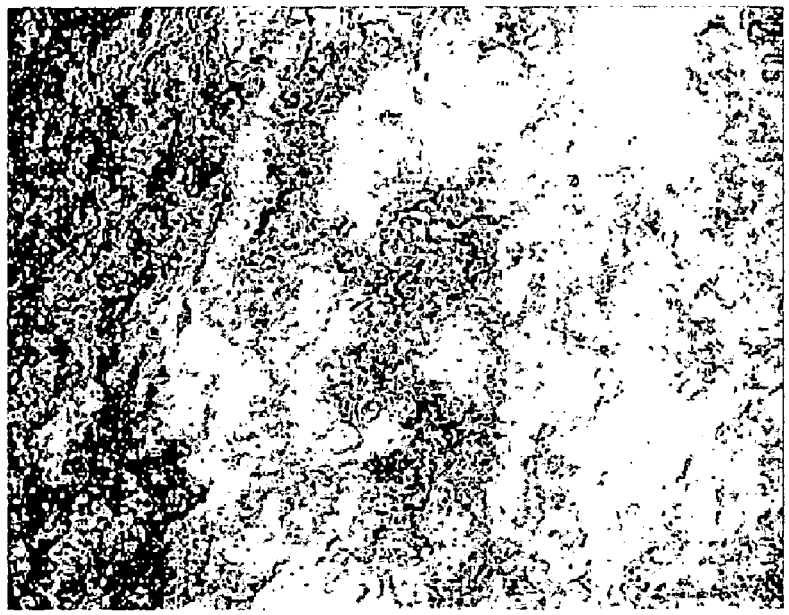
FIG. 2A illustrates the result of applying an edge-detection algorithm to seismic data without first applying the smoothing method in accordance with the present invention.
Figure 2B:
FIG. 2B illustrates the result of applying the edge-detection algorithm to the seismic data after first applying the smoothing method in accordance with the present invention.

FIG. 2A shows the edge-detection result using data without the smoothing method applied, while FIG. 2B shows the result using data to which the smoothing method was first applied. The edges in FIG. 2B are clearer and sharper than those in FIG. 2A.

Figure 3A:
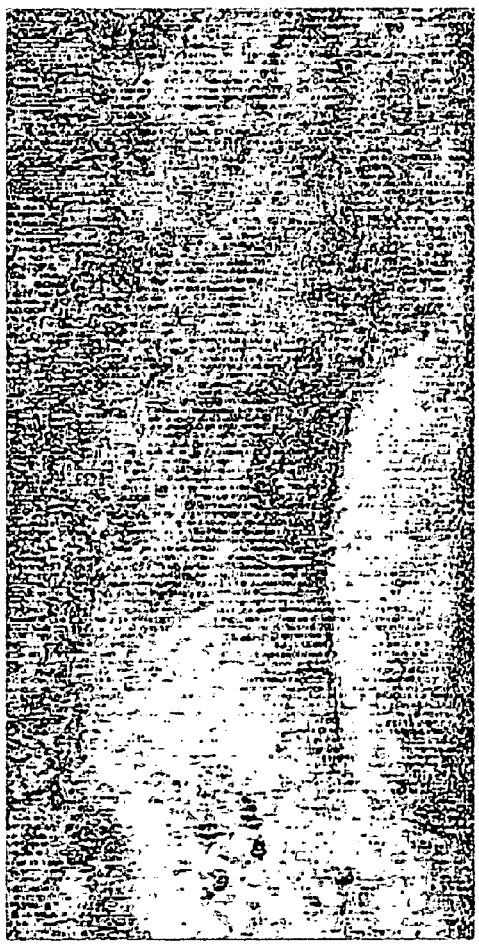
FIG. 3A illustrates the result of applying the edge-detection algorithm to other seismic data without first applying the smoothing method in accordance with the present invention.
Figure 3B:
FIG. 3B illustrates the result of applying the edge-detection algorithm to the other seismic data after first applying the smoothing method in accordance with the present invention.

FIGS. 3A and 3B illustrate another example. Here again, FIG. 3A shows the edge-detection result using data without the smoothing method applied, while FIG. 3B shows the result using data to which the smoothing method was first applied. In FIG. 3A, strong footprints are visible, while in FIG. 3B they have been suppressed by smoothing.

Figure 4:
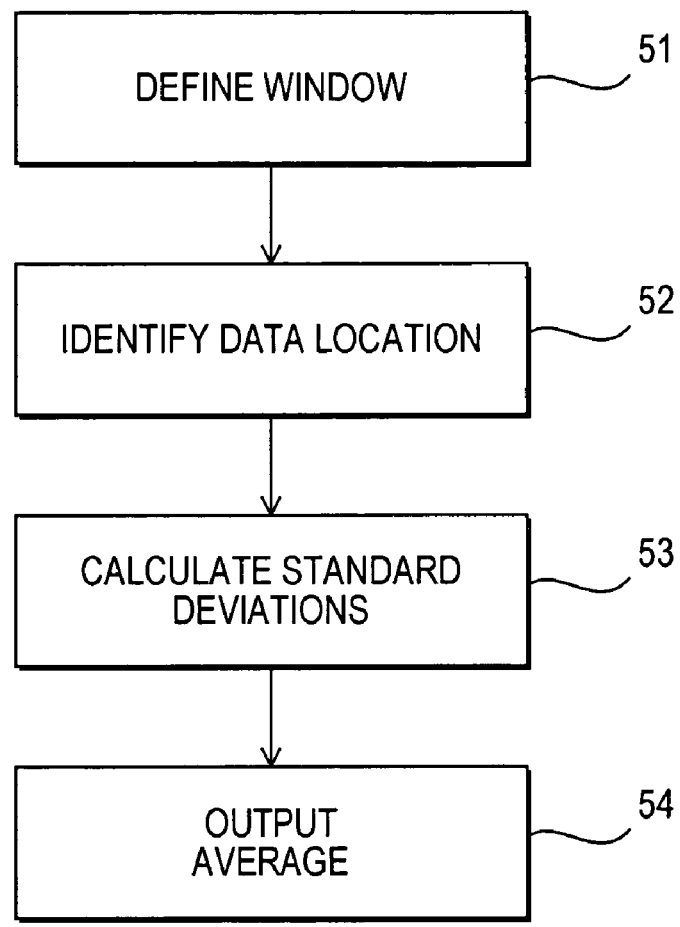
FIG. 4 is a flowchart of a method in accordance with the present invention.

FIG. 4 is a flowchart of a preferred embodiment of the edge-preserving smoothing method in accordance with the present invention. In step S1, the basic window parameters are defined (e.g. 1, 2 or 3 dimensions, number of points, shape of the windows, sliding distance etc.). In step S2, many windows are formed around an output location and each window covers a segment of the neighborhood surrounding the location. In step S3 the standard deviations for the different window positions around this location are calculated. In step S4, the window having the smallest standard deviation is selected and the average of the data in this window is output as a corrected value for this location. The method then returns to step S2 to complete processing the rest of the data.

Figure 5:
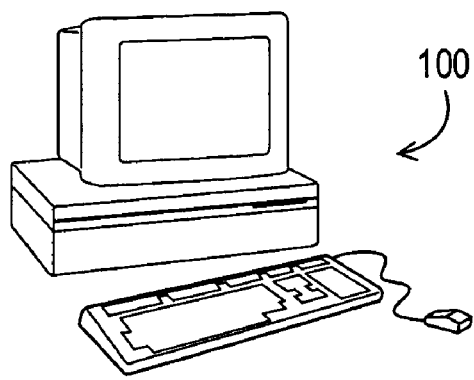
FIG. 5 is a sketch of an apparatus for implementing a method in accordance with the present invention.

FIG. 5 illustrates a computer 100 as an apparatus for implementing the method in accordance with the present invention. Generally, a computer is understood by those of ordinary skill in the art as including means for performing the functional steps of the method, such as means for selecting an output point in the data, means for identifying a most homogeneous neighborhood around the selected output point, and means for outputting a corrected value for the selected output point based upon data points in the identified neighborhood, where the means for identifying includes, for example, means for defining a plurality of neighborhoods around the selected output point, means for calculating a standard deviation of data points within each of the plurality of neighborhoods, and means for identifying the most homogeneous neighborhood as the one of the plurality of neighborhoods having the least standard deviation.

However, those of ordinary skill in the art will understand that other apparatus, or combinations of apparatuses, may be used to effect these functions.

Thus, unlike the conventional f-x deconvolution or PEF methods, the method in accordance with the present invention does not heavily depend on the predictability of signals. The edge-preserving smoothing method in accordance with the present invention can reduce random noise without altering sharp boundaries, and therefore is an ideal preconditioning process before the application of seismic edged-detection (or coherence cube) algorithms.

While the disclosed method and apparatus have been particularly shown and described with respect to the preferred embodiments, it is understood by those skilled in the art that various modifications in form and detail may be made therein without departing from the scope and spirit of the invention. Accordingly, modifications such as those suggested above, but not limited thereto are to be considered within the scope of the invention, which is to be determined by reference to the appended claims.

We claim:

1. A method of smoothing data to reduce or remove noise while preserving edge information in the data, said method comprising the steps of:
   selecting an output point in the data;
   identifying a most homogeneous neighborhood around the selected output point based upon a standard deviation of that neighborhood, including the steps of:
      defining a plurality of neighborhoods around the selected output point;
      calculating a standard deviation of data points within each of the plurality of neighborhoods; and
      identifying the most homogeneous neighborhood as the one of the plurality of neighborhoods having the least standard deviation; and
   outputting a corrected value for the selected output point based upon data in the identified neighborhood.

2. The method of claim 1, wherein each of the plurality of neighborhoods is defined as a fragment of a 3-D seismic cube.

3. The method of claim 2, wherein each of the plurality of neighborhoods is defined by a location in the data and a window around that location.

4. Apparatus for smoothing data to reduce or remove noise while preserving edge information in the data, said apparatus comprising:
   means for selecting an output point in the data;
   means for identifying a most homogeneous neighborhood around the selected output point, including:
      means for defining a plurality of neighborhoods around the selected output point;
      means for calculating a standard deviation of data points within each of the plurality of neighborhoods; and
      means for identifying the most homogeneous neighborhood as the one of the plurality of neighborhoods having the least standard deviation; and
   means for outputting a corrected value for the selected output point based upon data points in the identified neighborhood.

5. The method of claim 4, wherein each of the plurality of neighborhoods is defined by a location in the data and a window around that location.

* * * * *